(12) United States Patent
La Fleur et al.

(10) Patent No.: US 10,961,330 B2
(45) Date of Patent: Mar. 30, 2021

(54) POLYMERIC BINDERS FOR INK JET INKS

(71) Applicant: Rohm and Haas Company, Collegeville, PA (US)

(72) Inventors: Edward La Fleur, Holland, PA (US); Himal Ray, Collegeville, PA (US); Jose Antonio Trejo O'Reilly, Lansdale, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/889,717

(22) Filed: Feb. 6, 2018

(65) Prior Publication Data

US 2018/0162963 A1    Jun. 14, 2018

Related U.S. Application Data

(62) Division of application No. 15/310,935, filed as application No. PCT/US2015/031729 on May 20, 2015, now Pat. No. 9,932,419.

(60) Provisional application No. 62/001,720, filed on May 22, 2014.

(51) Int. Cl.
| | |
|---|---|
| *C08F 6/16* | (2006.01) |
| *C09D 11/107* | (2014.01) |
| *C09D 11/38* | (2014.01) |
| *C08F 2/26* | (2006.01) |
| *C08F 220/14* | (2006.01) |
| *C08F 220/18* | (2006.01) |

(52) U.S. Cl.
CPC .................. *C08F 6/16* (2013.01); *C08F 2/26* (2013.01); *C08F 220/14* (2013.01); *C08F 220/18* (2013.01); *C09D 11/107* (2013.01); *C09D 11/38* (2013.01)

(58) Field of Classification Search
CPC ........ C08F 6/16; C08F 220/10; C08F 220/14; C08F 2/26; C08F 220/18; C09D 11/38; C09D 11/107
USPC ........................................................ 524/561
See application file for complete search history.

(56) References Cited

U.S. PATENT DOCUMENTS

| | | | |
|---|---|---|---|
| 4,853,422 A | 8/1989 | Hahn, Jr. | |
| 6,541,590 B1 * | 4/2003 | Johnson ................. | C09D 11/30 526/281 |
| 2002/0085076 A1 * | 7/2002 | Romano, Jr. .............. | B41J 2/18 347/89 |
| 2007/0100069 A1 | 5/2007 | Chen et al. | |
| 2011/0263752 A1 * | 10/2011 | Hiraishi ............... | C09D 11/322 523/310 |
| 2012/0062646 A1 * | 3/2012 | Hasegawa ............ | C09D 11/322 347/20 |

OTHER PUBLICATIONS

Guyot, "Polymerizable surfactants", Curr Opinion Coll Interf Sci, vol. 1, pp. 580-586 (1996).

\* cited by examiner

*Primary Examiner* — Hui H Chin

(57) ABSTRACT

A process for improving a latex comprising the steps of (a) providing a latex comprising a polymer binder, wherein said polymer binder is formed by polymerization of a monomer mixture comprising one or more ethylenically unsaturated carboxylic acid functional monomer, and (b) passing said latex comprising said polymer binder over a cation exchange resin.

4 Claims, 1 Drawing Sheet

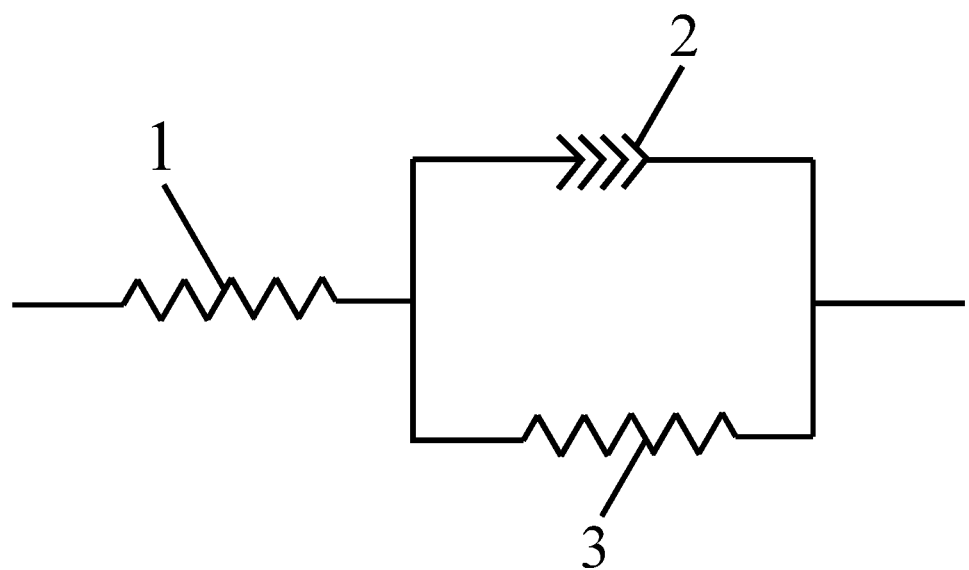

POLYMERIC BINDERS FOR INK JET INKS

Certain ink jet inks contain a liquid medium; a colorant, such as a pigment or dye; and a binder or resin to aid in dispersing the pigment in the medium and to affix the colorant to the print surface. Polymer binders have been added to ink jet ink compositions to improve durability, to improve print quality and to reduce color bleeding and feathering. However, the inclusion of such binders can result in increased printhead maintenance problems, including clogging of the nozzles and kogation, i.e. formation of film on or about the heater. Also, polymers may tend to form films on the nozzle plate. The addition of polymers to ink jet ink compositions also may cause decreased pigment dispersion stability and interference with bubble formation.

One useful form of polymer binder is the form of latex (that is, polymer particles dispersed in an aqueous medium). U.S. Pat. No. 6,541,590 discloses polymer binders that are emulsion-polymerized. The process of emulsion polymerization is known to produce polymers in the form of a latex. It has been discovered in the course of the present invention that some latex polymer binders made according to the methods of U.S. Pat. No. 6,541,590 contain undesirably high levels of multivalent cations such as $Zn^{+2}$. It has also been discovered that levels of multivalent cations that are too high can lead to one or more problems. For example, an ink made using such a binder may fail to perform properly. It is desired to provide a latex polymer binder that has reduced level of multivalent cations. It is also desired to provide a method for producing such a latex polymer binder.

It has also been discovered in the course of the present invention that it is desirable for the latex polymer binder to possess complex dielectric properties that are close to certain target values. It is desirable for latex polymer binders to have resistance and relaxation time (parameters $R_1$ and $\tau$, defined in detail below) of 150 ohm and 5.4 E-07 seconds, respectively. Also, it is desirable to provide a process that produces latex polymer binders that have less batch-to-batch variability in the parameters $R_1$ and $\tau$ than the variability produced by previous processes.

The following is a statement of the invention.

A first aspect of the present invention is a process for improving a latex comprising the steps of
 (a) providing a latex comprising a polymer binder, wherein said polymer binder is formed by polymerization of a monomer mixture comprising more than 4 to 15 weight % one or more ethylenically unsaturated carboxylic acid functional monomer, based on the weight of said monomer mixture, and
 (b) passing said latex comprising said polymer binder over a cation exchange resin.

A second aspect of the present invention is a process for improving a latex comprising the steps of
 (a) providing a latex comprising a polymer binder, wherein said polymer binder is formed by polymerization of a monomer mixture comprising
  (i) more than 4 to 15 weight % one or more ethylenically unsaturated carboxylic acid functional monomer, based on the weight of said monomer mixture, and
  (ii) 0.05 to 5 weight % one or more polymerizable surfactant monomer comprising hydrophobic and hydrophilic functional groups, wherein said hydrophobic functional group comprises a polymerizable group within it, based on the weight of said monomer mixture; and
 (b) passing said latex comprising said polymer binder over a cation exchange resin.

The following is a brief description of the drawing.

FIG. 1 shows a model circuit, which includes resistance R1, labeled 1; constant phase element CPE, labeled 2; and resistance R2, labeled 3.

The following is a detailed description of the invention.

In the practice of the present invention, the polymer binder is preferably formed by polymerization of a monomer mixture comprising a polymerizable surfactant monomer. Polymerizable surfactant monomers are surface active compounds having a polymerizable group, such as an allyl, acryl, methallyl or methacryl group (herein also referred to as (meth)acryl or (meth)allyl group), and which may be used as an emulsifier in an emulsion polymerization. Thus, the polymerizable surfactant preferably functions as both a surfactant and as a comonomer. The polymerizable surfactant may be cationic, anionic or nonionic.

Preferably, the polymer binder is made by a process of emulsion polymerization.

Suitable polymerizable surfactant monomers contain hydrophobic and hydrophilic functional groups, wherein said hydrophobic functional group comprises a polymerizable group within it include, for example, anionic surfactant monomers such as sulphates, phosphates, sulphosuccinate half esters, and sulphosuccinate diesters bearing copolymerizable reactive groups and nonionic surfactant monomers such as nonylphenoxy propenyl polyethoxylated alcohols (for example as Noigen RN-20 from Dai-ichi Corp). Preferred polymerizable surfactant monomers are nonylphenoxy propenyl polyethoxylated sulphate (for example as Hitenol from Dai-ichi Corp); sodium alkyl allyl sulphosuccinate (for example as Trem LF-40 from Henkel Corp); ammonium di-(tricyclo(5.2.1.0 2,6) dec-3-en-(8 or 9)oxyethyl) sulfosuccinate; and ammonium di-(tricyclo(5.2.1.0 2,6) dec-3-en-(8 or 9) sulfosuccinate. Additionally, the ammonium and metal salts of unsaturated C6 to C30 organic acids may be suitable, these may be used alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol 1010 Dimer Acid. Suitable polymerizable surfactant monomers also include, for example, maleate derivatives (as described in U.S. Pat. No. 4,246,387), and allyl derivatives of alkyl phenol ethoxylates (as described in JP-62227435).

The amount of polymerizable surfactant monomer in the monomer mix is preferably from 0.075 to 2 wt %, more preferably 0.075 to 0.5 wt %, based on the weight of said mixture.

Also contemplated are embodiments in which a polymerizable surfactant monomer is not used. Among such embodiments, preferably a surfactant is used that is not a polymerizable surfactant. Among such embodiments, preferred surfactants are anionic surfactants, preferably sulfate surfactants, sulfonate surfactants, or a mixture thereof. Among such embodiments, the preferred amount of surfactant is from 0.075 to 2 wt %, more preferably 0.075 to 0.5 wt %, based on the weight of the monomer mixture. Among such embodiments, the surfactant is used as the emulsion stabilizer in an aqueous emulsion polymerization process that forms the polymer binder.

The ethylenically unsaturated carboxylic acid functional monomers are preferably C3 to C20 ethylenically unsaturated carboxylic acids, more preferably monomers selected from the group consisting of acrylic acid, methacrylic acid, itaconic acid, fumaric acid, maleic acid and anhydrides of such acids; their basic salts e.g. the ammonium, quaternary alkyl ammonium, lithium, sodium and potassium salts thereof; and mixtures of such monomers. More preferred are acrylic acid, methacrylic acid, and mixtures thereof. Alternatively, the ethylenically unsaturated carboxylic acid monomer may be an oligomer of acrylic or methacrylic acid, preferably having a molecular weight of no more than 5000 Daltons.

The amount of ethylenically unsaturated carboxylic acid monomer in the monomer mix is preferably from more than 4 to 10 wt %, more preferably from 4.5 to 9 wt %, based on the weight of said mixture. The phrase "more than 4 to X wt % means herein that the amount is more than 4 wt % and is also less than or equal to X wt %."

Other ethylenically unsaturated monomers suitable for use in said monomer mix include one or more monomers selected from, but not limited to: substituted e.g. hydroxy- or acetoacetoxy-substituted and unsubstituted (C1 to C50, preferably C1-C22, most preferably C1 to C18) alkyl (meth) acrylates, styrene and substituted styrenes, vinyl acrylates, vinyl acetates, fluoromethacrylates, acrylamide, substituted acrylamides, methacrylamides, substituted methacrylamides, and combinations thereof. Among the esters of acrylic acid and methacrylic acid, preferred monomers include methyl acrylate, ethyl acrylate, propyl acrylate, butyl acrylate, ethylhexyl acrylate, lauryl acrylate, methyl methacrylate, ethyl methacrylate, propyl methacrylate, butyl methacrylate, lauryl methacrylate, isobutylene methacrylate, hydroxyethyl (meth)acrylate and acetoacetoxy (meth)acrylate. More preferably, the monomers are selected from the group consisting of methyl acrylate, ethyl acrylate, propyl acrylate, butyl acrylate, ethylhexyl acrylate, lauryl acrylate, methyl methacrylate, ethyl methacrylate, propyl methacrylate, butyl methacrylate, lauryl methacrylate, isobutylene methacrylate, styrene, acrylamide, vinyl acrylate, vinyl acetate, hydroxyethyl acrylate and hydroxyethyl methacrylate.

In one embodiment, the binder comprises an addition copolymer of ethylhexyl acrylate, methyl methacrylate, methacrylic acid and sodium alkyl allyl sulphosuccinate.

Preferably the binder comprises an addition polymer with a glass transition temperature, Tg, of at least −40° C., more preferably in the range from −35 to about 120° C., yet more preferably in the range from −35 to 20° C., and even more preferably in the range from −30 to 10° C. Tg can be determined Differential Scanning calorimetery at 10° C./min, using the midpoint method.

The practice of the present invention involves the use of a latex that contains a polymer binder. That latex is known herein as a "latex polymer binder." Preferably, the polymer binder is in the form of polymeric particles distributed throughout a continuous aqueous liquid medium. Preferably, the latex polymer binder has volume average diameter in the range from about 100 to 400 nm. More preferably, the volume average diameter is in the range 200 to 350 nm. The average particle diameter may be determined by a light scattering technique, such as by employing a Brookhaven Instruments Corporation, "BI-90 Particle Sizer" analyzer.

The particle size distribution of the binder polymer may be unimodal, bimodal or polymodal, but modality is not considered important to the practice of this invention.

The molecular weight of the polymeric binder is not critical. However, it has been found that the binder polymers preferably has a molecular weight in the range from about 10,000 to about 2,000,000 Daltons; more preferably, 50,000 to 1,000,000 Daltons. The molecular weight as used herein is defined as the weight average molecular weight and may be determined by gel permeation chromatography in THF as solvent.

The addition polymer may be prepared by a conventional persulfate-initiated thermal process known in the art such as batch, semi-batch, gradual addition or continuous, for example as described in EP-A-0747456. The process may be single-stage or multi-stage. In a multi-stage process, a polymerization process is brought to completion (90% or more of the monomer converted to polymer), and then further monomer is introduced into the same vessel, and the further monomer is polymerized in the presence of the polymer previously formed. The monomers are polymerized to preferably greater than 99% conversion and then the reaction is cooled to room temperature (20-25° C.) after the addition of the appropriate amount of neutralizing base to control pH. The pH is adjusted to between pH 7-9, more preferably between pH 7-8, with neutralizer such as, for example, ammonia, lithium hydroxide, sodium hydroxide, potassium hydroxide or combinations of these neutralizers.

The process of the present invention involves the use of a cation exchange resin. A cation exchange resin is a polymer composition that has acidic groups covalently attached to the polymer chain and that has cations associated with the acid groups. When an aqueous composition containing dissolved cations is passed over the cation exchange resin, there is a tendency for the cations that were originally associated with the acid groups on the cation exchange resin to be removed and to be replaced by cations that were dissolved in the aqueous composition.

The polymer in the cation exchange resin may be any type of polymer. Preferred polymers are polymerized from monomers that contain one or more vinyl group. Preferred monomers are acrylic acid, methacrylic acid, substituted or unsubstituted esters of acrylic acid, substituted or unsubstituted esters of methacrylic acid, styrene, derivatives of styrene, and mixtures thereof. Preferred polymers are polymerized from a mixture of monomers that contains one or more monomer that has two or more vinyl groups.

On the cation exchange resin, preferred acid groups are carboxylate, phosphate, and sulfonate; more preferred are carboxylate and sulfonate. The acid groups may be resident on one or more monomers, or the acid groups may be attached to the polymer backbone by a chemical reaction after polymerization takes place, or a combination thereof.

Prior to contact with an aqueous composition containing a latex, a cation exchange resin may be characterized by the cations that it contains. When 90 mole % or more of the cations are $H^+$, the cation exchange resin is said to be in the acid form. When a cation exchange resin is in acid form, the acid groups may either be in the form of a nonionic acid group with the H atom attached or in the form of an anion and an $H^+$ cation. When 90 mole % or more of the cations present with the cation exchange resin are cations of alkali metals, the cation exchange resin is said to be in alkali cation form. When 90 mole % or more of the cations present with the cation exchange resin are cations of a single specific alkali metal (for example, sodium), the cation exchange resin is said to be in the form of that specific alkali metal (for example, "sodium form").

A cation exchange resin may be characterized by the pKa. A cation exchange resin with pKa of 3 or above is considered herein to be a weak acid cation exchange resin. A cation exchange resin with pKa below 3 is considered herein to be a strong acid cation exchange resin.

Preferably, the cation exchange resin, prior to contact with aqueous composition containing a latex, belongs to one of the following categories: (I) cation exchange resins (either strong acid or weak acid) in alkali cation form, or (II) weak acid cation exchange resins in acid form.

Preferably, the cation exchange resin is in the form of beads. Preferably, the weight-average diameter of the beads is 0.01 mm to 1.0 mm; more preferably 0.1 to 1.0 mm.

The process of the present invention involves passing a latex over a cation exchange resin. The process of "passing over" is accomplished by providing a container that has an inlet and an outlet. Cation exchange resin is placed into the container; latex enters the container through the inlet, contacts the cation exchange resin, and exits the container through the outlet, while the cation exchange resin is retained in the container by a filter or other device that retains the cation exchange resin while passing the latex. Preferably, latex is pushed through the container under pressure. The pressure may be applied by gravity or by a mechanical pump.

The term "passing over" does not include methods in which a fixed amount of latex and a fixed amount of cation exchange resin are placed together in a container and stirred, followed by pouring the mixture through a filter to separate the cation exchange resin from the latex.

It is contemplated that passing the latex polymer binder over the cation exchange resin will remove or significantly reduce the concentration of multivalent cations. Examples of multivalent cations are multivalent cations of alkaline earths, multivalent cations of transition metals, and multivalent cations of other metals. For example, it is contemplated that passing the latex polymer binder over the cation exchange resin will remove or significantly reduce the concentration of multivalent cations of manganese, iron, cobalt, nickel, copper, and zinc.

After passing over the cation exchange resin, the latex polymer binder may be incorporated in an ink composition, preferably an ink jet ink composition, comprising, for example, pigment, binder and an aqueous medium. Preferably, the binder is present at a level of 0.1 to 10 weight percent, preferably, 0.5 to 8 weight percent, more preferably 1 to 5 weight percent relative to the total weight of the ink composition. The aqueous carrier may be water; preferably, deionized water. In one embodiment, the aqueous carrier is present at from about 40% to about 95%, preferably from about 55% to about 80%, most preferably, from about 70% to about 80% by weight of the ink composition. Selection of a suitable mixture for the ink composition using the binder of the present invention depends upon the requirements of the specific ink being formulated, such as the desired surface tension and viscosity, the pigment used, the drying time required for the pigmented ink and the type of paper onto which the ink will be printed.

The ink composition using the binder of the present invention may also include water miscible materials such as humectants, dispersants, penetrants, chelating agents, co-solvents, defoamers, buffers, biocides, fungicides, viscosity modifiers, bactericides, surfactants, anti-curling agents, anti-bleed agents and surface tension modifiers, all as is known in the art.

Generally, the amount of pigments used is less that 10% and is typically from 3-8% by weight based on the total weight of all the components of the ink. Preferably, the pigment particle size is from 0.05 to 2 microns, more preferably not more than one micron and most preferably not more than 0.3 microns.

The amount of humectant used is determined by the properties of the ink and may range from 1-30%, preferably from 5-15% by weight, based on the total weight of all the components in the ink. Examples of commonly used humectants useful in forming the ink are: glycols, polyethylene glycols, glycerol, ethanolamine, diethanolamine, alcohols, and pyrrolidones. Other humectants known in the art may be used as well.

The use of suitable penetrants will depend on the specific application of the ink. Useful examples include pyrrolidone, and N-methyl-2-pyrrolidone.

The amount of defoaming agent in the ink, if used, will typically range from 0.05-0.5% by weight, and is more typically 0.1 wt. %. The amount required depends on the process used in making the pigment dispersion component of the ink. Defoaming agents useful in forming aqueous dispersions of pigments are well known in the art and commercially available examples include Surfynol 104H and Surfynol DF-37 (Air Products, Allentown, Pa.).

The remaining portion of the ink is generally water. The amount of water preferably is from 65-90% by weight, more preferably from 75-85% by weight, based on the total weight of all the components in the ink.

The ink composition may further comprise additional components including without limitation process aids such as other (free) surfactants, protective colloids, and other stabilizers known to those skilled in the art. Suitable surfactants, for example, include sodium lauryl sulfate, sodium dodecylbenzene sulfonate, sodium dioctyl sulfosuccinate, and ammonium perfluroralkyl sulfonates, Triton X-100, Triton X-405, and polyoxyethylenated polyoxypropylene glycols.

The ink compositions may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

One method for preparation is as follows: Mix the aqueous carrier, humectant(s), surfactant(s) and penetrant(s) for 10 minutes, or until homogenous. Prepare pigment-dispersant mixture by milling a 5 to 1 ratio of pigment to dispersant to a total of 20% solids in water. Slowly add aqueous carrier/humectant/surfactant/penetrant solution to pigment-dispersant while pigment(s) remains stirring. Let stir for another 10 minutes, or until homogeneous. Slowly add the pigment dispersion/carrier/humectant/surfactant to the polymeric binder with stirring. Continue to stir for 10 minutes or until homogenous. Adjust pH of the resultant ink to 8.2-8.5 (e.g. by adding sufficient 20% NH4OH). Filter through a 1 micrometer filter.

It is expected that the ink compositions using the binders of the present invention would include any additives necessary to obtain the desired physical properties required for the end use of the ink composition such additives include chelating agents, buffers, biocides, fungicides, antioxidants, rheology modifiers, thickeners, bacteriocides, surfactants, anti-curling agents, anti-bleed agents and surface tension modifiers, all as discussed above.

Also contemplated are embodiments in which an ink composition is passed over a cation exchange resin. Preferred cation exchange resins and preferred methods of passing an ink composition over the cation exchange resin are the same as those described above for passing a latex over the cation exchange resin. Preferably the amount of water in the ink composition is 40% to 95% by weight, based on the weight of the ink composition.

The following are examples of the present invention.

EXAMPLE 1: PREPARATION P-1: PREPARATION OF LATEX POLYMER BINDER

A monomer mixture was prepared, having methyl methacrylate (MMA), 2-ethylhexyl acrylate (2-EHA), and methacrylic acid (MAA) in the weight percent of: 81.0, 18.0 and 0.1 respectively. From this composition an homogenized mixture is prepared, which contains the following components. First homogenized monomer mixture (ME1) contained 60.18% of MMA, 13.37% of 2-EHA, 0.74% of MAA, 25.28% of deionoized (DI) water and 0.42% of a 36% aqueous sodium dodectyl allyl sulfosuccinate (TREM™ LF-40 surfactant, from Henckel Corporation) solution. The second homogenized monomer mixture (ME2) contains all of the ingredients of the first mixture and an additional 5.61% of MAA. Each monomer mixture was polymerized according to the following procedure. To an appropriate glass vessel equipped with stirrer, heater, a reflux condenser, and nitrogen sparge tube, was added 94.73% of deionized water, and 0.30% of potassium carbonate. The kettle content (DI water) was sparged for one hour with nitrogen while heating to 85° C. The initiator solution (2.91 g of potassium persulphate (KPS) in 92.33 g of distilled water) was added to the kettle which was stirred for one minute before adding the seed latex plus 22.33 grams of rinse distilled water. The temperature of the reaction vessel was then set to 80° C. and the emulsified monomer (ME1) was fed at a rate of 12.38 g/min for 10 minutes at the 85° C. temperature before co-feeding the initiator (1.45 g of KPS in 53.59 g of distilled water) at the rate of 0.79 g/min. The temperature was kept at 85° C. and after 10 minutes the monomer emulsion (ME1 followed by ME2) feed was increased to 24.76 g/min. for the next 60 minutes. At the end of the feed schedule, the kettle was held at the final temperature for 20 minutes. The reactor was then cooled to 75° C. and 8.72 grams of a 0.1% $Fe^{2+}$ solution was added with an aliquot consisting of 0.25 g of t-butyl hydroperoxide (tBHP) in 20.0 g of distilled water and held for 5 minutes at the 75° C. temperature. The reactor was then cooled to a temperature of 65° C. and 0.6 g of NaBS in 20.0 g of distilled water was added and held for 20 minutes at this temperature. Through this cooling process, an initial slow addition of 1.8 g of tBHP in 50 g of distilled water was fed to the reactor. This initiator was similarly followed up by another feed of 2.38 g of sodium bi-sulphate in 50 g of distilled water. At the end of this feed schedule the batch was cooled to a temperature of 40° C. and the pH was adjusted by the addition of 13.86 g of KOH in 142.14 g of distilled water. At the completion of the neutralization process 1.97 g of biocide (Kordek™ LX 5000 biocide (50%) in 9 g of distilled water was added to the latex. The latex preparation steps outlined yields a colloidal dispersion with 31.60% of solids and an average particle size of 255.9 nm.

EXAMPLE 2: BATCHES B-1 THROUGH B-6

Six batches were made as in preparation P-1, except that the amounts were increased proportionately to produce a larger size sample of latex polymer binder.

EXAMPLE 3: MEASUREMENT OF COMPLEX DIELECTRIC PROPERTIES

The complex dielectric properties of a latex was measured at 25° C. in a two electrode cell with stainless steel blocking electrodes. Frequency was varied continuously from 0.1 Hz to 1.00 MHz. The measuring instrument is a Solartron™ 1260 Impedance/Gain-Phase Analyzer coupled to the Solartron™ SI1287 Advanced Electrochemical Interface (from Solartron Analytical) which can be used as a potentiostat or galvanostat with selectable control loop bandwidth to ensure stable operation for various types of electrochemical cells. A 0.01 Va.c. amplitude was chosen so as to minimize any potential electrolytic effects as well as non-linear electric double layer and polarization effects in the cell. The surface area of each blocking electrode is 1.2568 cm2. The electrode gap of the cell is defined by the thickness (25.5 μm) of a Celgard™ 2500 spacer (from Celgard Company).

At each frequency (ω), the instrument measures the magnitude of the impedance, denoted |Z|, and the phase shift, denoted θ. Then the parameters $Z_{real}$ and $Z_{imaginary}$ are calculated as follows:

$$Z_{real}=|Z|\cos(\theta)$$

$$Z_{imaginary}=|Z|\sin(\theta)$$

Each latex is tested at a large number of values of ω; measurement at each value of ω produces a data point with coordinates ($Z_{real}$, $Z_{imaginary}$). The measurements for a given latex create a curve of $Z_{imaginary}$ vs. $Z_{real}$. That curve is then fit by non-linear regression analysis using the following procedure.

The latex is considered to have complex dielectric behavior that is well modeled by the circuit shown in FIG. 1. Item 1 is a resistor with resistance $R_1$; item 2 is a constant phase element with impedance $Z_{CPE}$; and item 3 is a resistor with resistance $R_2$. The impedance $Z_{CPE}$ is considered to obey the equation $$Z_{CPE} = \frac{1}{T(j\omega)^p}$$

where T and p are frequency-independent parameters characteristic of the specific latex sample. The parameter p has value of 0 to 1. The curve of $Z_{imaginary}$ vs. $Z_{real}$ is then fit using the following equations to determine $R_1$, $R_2$, T, and p:

$$Z_{real} = R_1 + \frac{R_2^2 T(\omega)^p \cos\left(\frac{p\pi}{2}\right)}{1+(R_2 T(\omega)^p)^2 + 2R_2 T(\omega)^p \cos\left(\frac{p\pi}{2}\right)}$$

$$-Z_{imaginary} = \frac{R_2^2 T(\omega)^p \sin\left(\frac{p\pi}{2}\right)}{1+(R_2 T(\omega)^p)^2 + 2R_2 T(\omega)^p \cos\left(\frac{p\pi}{2}\right)}$$

After the fitting procedure determines $R_1$, $R_2$, T, and p, the relaxation time, denoted τ, is calculated: $\tau=T^{(1/p)}$. In the following discussion, the following parameters are reported and discussed: the resistance $R_1$ (ohms) and the relaxation time τ (seconds).

COMPARATIVE EXAMPLE 4: COMPARATIVE EXAMPLES: FIVE BATCHES WITHOUT CONTACT WITH CATION EXCHANGE RESIN

Five batches of the same latex polymer binder composition were made, all using the procedure described above. The lattices were subjected to dielectric measurements prior to any contact with cation exchange resin. The results of the dielectric measurements and parameter fitting were as follows:

| Comparative Latices: no contact with cation exchange resin | | | |
|---|---|---|---|
| Batch Number | pH | $R_1$ (ohm) | Relaxation time (s) |
| B-1 | 6.9 | 125.9 | 2.65E–07 |
| B-2 | 6.89 | 159.8 | 4.51E–07 |
| B-3 | 7.01 | 147.3 | 3.87E–07 |
| B-4 | 6.91 | 229 | 4.21E–07 |
| B-5 | 6.68 | 195.8 | 3.83E–07 |
| average | | 172 | 3.81E–07 |
| std. dev. | | 40.9 | 7.1E–08 |

The notation "E–07" is equivalent to "$\times 10^{-7}$".

EXAMPLE 5: INVENTION EXAMPLES: SAME BATCHES AS IN EXAMPLE 4, AFTER PASSING OVER CATION EXCHANGE RESIN

The five batches described above were passed over a cation exchange resin as follows. A one gallon sample taken from each batch was passed through a 5.08 cm (2 inch)×61 cm (2 ft). column filled with a bed volume of 1000 mL of Dowex™ MAC-3 resin. The aqueous latex was pumped at the fixed rate of 180 mL/min. Each remediated (that is, passed through the column) sample of latex was collected in a one gallon container. The pH of the remediated latex was 2.18. The pH of the latex was adjusted using KOH solution. The mixing procedure used a vertical stirrer for mixing (observing the occurrence of a vortex during agitation) the latex in the container. The pH of the latex was measured during addition of the KOH solution. The pH was continuously monitored during the drop wise addition of the 14% KOH solution. The addition of KOH solution was stopped when the recorded pH was between 7.5 and 7.75.

| Inventive Examples: Latices after passing over cation exchange resin | | | |
|---|---|---|---|
| Batch Number | pH | $R_1$ (ohm) | Relaxation time (s) |
| B-1 | 7.5 | 148.1 | 4.89E–07 |
| B-2 | 7.5 | 134.6 | 4.17E–07 |
| B-3 | 7.5 | 160.1 | 5.33E–07 |
| B-4 | 7.5 | 159.1 | 5.61E–07 |
| B-5 | 7.5 | 221.2* | 5.39E–07* |
| average | | 165 | 5.08E–07 |
| std. dev. | | 33.2 | 5.7E–08 |

*Batch B-5 was divided into five parts; each part was passed over cation exchange resin and then subjected to the dielectric testing. The values shown above are the average of the results of the five tests on the five parts.

The average $R_1$ value of the inventive batches is closer to the target value of 150 ohm than is the average $R_1$ value of the comparative batches. Also, the standard deviation of the $R_1$ values of the inventive batches is smaller than the standard deviation of the $R_1$ values of the comparative batches. Similarly, the average relaxation time value of the inventive batches is closer to the target value of 5.4 E-07 seconds than is the average relaxation time value of the comparative batches. Also, the standard deviation of the relaxation time values of the inventive batches is smaller than the standard deviation of the relaxation time values of the comparative batches. Thus, the inventive process produces latices that are closer to the target values than does the comparative process, and the inventive process is less variable than the comparative process.

EXAMPLE 6: REMOVAL OF ZINC IONS FROM BATCH B-4

Batch B-4 contained 0.0024% zinc ions by weight. Two portions of this latex were separately passed over the cation exchange resin DOWEX™ MAC-3 resin (The Dow Chemical Company) (a weak acid, polyacrylic, macroporous cation exchange resin) as follows: Two 3.8 liter (one gallon) samples taken from batch B-4 were passed through a 5.08 cm (2 inch)×61 cm (2 ft). column filled with a bed volume of 1000 mL of Dowex™ MAC-3 resin. The aqueous latex was pumped at the fixed rate of 180 mL/min. Each of the two remediated samples of latex was collected in a 3.8 liter (one gallon) container. After passage over the cation exchange resin, one portion had 0.0011 percent zinc ions by weight and the other had 0.0014 percent zinc ions by weight.

The content of zinc ions was tested by inductively coupled mass spectrometry (ICP)

EXAMPLE 7: REMOVAL OF ZINC IONS FROM BATCH B-6

Batch B-6 contained 0.0025% zinc ions by weight. A portion of this latex was passed over the cation exchange resin Dowex™ Monosphere 99K/320 resin (The Dow Chemical Company) (a crosslinked polystyrene chromatographic cation exchange resin) as follows: A 3.8 liter (one gallon) sample taken from batch B-6 was passed through a 5.08 cm (2 inch)×61 cm (2 ft). column filled with a bed volume of 1000 mL of Dowex™ Monosphere 99K/320 resin. The aqueous latex was pumped at the fixed rate of 180 mL/min. After passage over the cation exchange resin, the latex had no detectable zinc ions (analyzed by ICP).

EXAMPLE 8: REPETITION OF EXAMPLE 6

As in Example 6, batch B-4 was passed over cation exchange resin Dowex™ MAC-3 resin. Extra care was taken, for example to make sure that the resin did not become saturated with zinc. After passing over the cation exchange resin, the latex was neutralized with KOH as described in Example 5. After passage over the cation exchange resin, the latex had no detectable zinc ions (analyzed by ICP).

EXAMPLE 9: PREPARATION OF LATEX POLYMER BINDER WITH CONVENTIONAL SURFACTANT

The latex preparation in Example 1 was repeated, with the difference that the polymerizable surfactant monomer was replaced by sodium lauryl sulfate (SLS), a non-polymerizable surfactant. Specifically, in each monomer emulsion, instead of "0.42% of a 36% aqueous sodium dodectyl allyl sulfosuccinate (TREM™ LF-40 surfactant, from Henckel Corporation) solution", the following was used: 0.565% of a 23% aqueous sodium lauryl sulfate solution.

EXAMPLE 10: DIELECTRIC MEASUREMENTS OF THE LATEX PREPARED IN EXAMPLE 9

The latex polymer binder prepared in Example 9 was tested for dielectric properties three times: (1) before passing over cation exchange resin, (2) after passing over cation exchange resin but without adjustment of pH, and (3) after passing over cation exchange resin and subsequent adjustment of pH with KOH as described in Example 5. Results were as follows:

Dielectric Properties of Latex of Example 9

| Property | (1) before resin | (2) after resin | (3) after resin and pH adjustment |
|---|---|---|---|
| pH | 7.65 | 2.36 | 7.66 |
| $R_1$ (ohm) | 106.9 | 168.6 | 184.7 |
| τ (sec)* | 2.38E−07 | 1.91E−07 | 6.24E−07 |

*Relaxation time

The invention claimed is:

1. A process for improving an ink composition comprising a latex comprising a polymer binder, said process comprising the steps of:
(a) providing said ink composition, wherein said polymer binder is formed by polymerization of a monomer mixture consisting of:
one or more ethylenically unsaturated carboxylic acid functional monomer, based on the weight of said monomer mixture, in an amount that is greater than 4 weight % and that is less than or equal to 15 weight %;
one or more monomers selected from the group consisting of hydroxy- or acetoacetoxy-substituted and unsubstituted (C1 to C50) alkyl (meth)acrylates, styrene and substituted styrenes, vinyl acrylates, vinyl acetates, fluoromethacrylates, acrylamide, methacrylamide, and combinations thereof;
optionally, based on the weight of said monomer mixture, 0.05 to 5 weight % one or more polymerizable surfactant monomer comprising hydrophobic and hydrophilic functional groups, wherein said hydrophobic functional group comprises a polymerizable group within it; and
(b) passing said ink composition over a cation exchange resin, wherein said cation exchange is an acid functional resin having a pKa of 3 or higher that is in acid form,
wherein said polymer binder has a volume average diameter of 100 to 400 nm.

2. The process of claim 1, wherein said monomer mixture comprises, based on the weight of said monomer mixture, 0.05 to 5 weight % of said one or more polymerizable surfactant monomer comprising hydrophobic and hydrophilic functional groups.

3. The process of claim 1, wherein said polymerization is an aqueous emulsion polymerization process.

4. The process of claim 1, wherein said monomer mixture does not contain said polymerizable surfactant monomer, and wherein said latex further comprises one or more anionic surfactant.

* * * * *